United States Patent Office 3,433,586
Patented Mar. 18, 1969

3,433,586
PROCESS FOR THE MANUFACTURE OF MAGNESIUM HYDROGEN-PHOSPHATE TRIHYDRATE
Heinz Harnisch, Lovenich, near Cologne, Joseph Cremer, Hermulheim, near Cologne, and Friedrich Schulte, Hurth, near Cologne, Germany, assignors to Knapsack Aktiengesellschaft, Knapsack, near Cologne, Germany, a corporation of Germany
No Drawing. Filed Jan. 12, 1966, Ser. No. 520,082
Claims priority, application Germany, Jan. 29, 1965, K 55,137
U.S. Cl. 23—109     11 Claims
Int. Cl. C01b 25/32

ABSTRACT OF THE DISCLOSURE

Production of secondary magnesium hydrogen-phosphate trihydrate by simultaneously introducing (a) phosphoric acid and/or a solution of an alkali metal monophosphate, (b) a solution of a magnesium salt and (c) a solution of an alkali metal oxide and/or carbonate into a reactor rapidly and intimately mixing (a), (b) and (c) and recovering the reaction product by filtration.

---

The present invention relates to a process for the manufacture of magnesium hydrogen phosphate-trihydrate (secondary magnesium phosphate-trihydrate).

It is known that magnesium hydrogen-phosphate-trihydrate can be produced by a process of the type wherein dilute phosphoric acid is introduced into a reaction vessel first and a magnesium oxide or magnesium hydroxide suspension is added subsequently under specific conditions. Before the resulting precipitated matter is filtered, the mixture is stirred for 30 minutes, mother liquor is decanted and the precipitated matter is stirred up again with water. These steps require much time and reactors having a large volume. It is also disadvantageous that magnesium hydrogen phosphate-trihydrate produced by the above process is obtained in the form of grains having a size substantially above $40\mu$. The final product must therefore always be subjected to grinding so as to produce granular matter having a definite grain size or containing the individual grains in a definite rate of distribution.

It is also known that an aqueous solution of a magnesium salt can be reacted with a dialkali or diammonium orthophosphate solution to give magnesium hydrogen-phosphate-trihydrate.

The above processes have the disadvantage of yielding products which are extremely difficult to filter.

The present invention now unexpectedly provides a process which enables the above difficulties to be avoided and wherein magnesium hydrogen phosphate-trihydrate is produced by introducing simultaneously phosphoric acid and/or a solution of an alkali metal monophosphate and a solution of a magnesium salt and an alkali metal oxide and/or carbonate, if desired in the presence of additional water, into a reactor, by rapidly and intimately mixing the components and successively filtering off the resulting reaction product in conventional manner and processing it.

The reaction yielding magnesium hydrogen phosphate-trihydrate can take place e.g. according to the following reaction equations:

(1)   $MgCl_2 + 2NaOH + H_3PO_4 + H_2O \rightarrow$
                            $MgHPO_4 \cdot 3H_2O + NaCl$
(2)   $MgCl_2 + Na_2CO_3 + H_3PO_4 + 2H_2O \rightarrow$
                          $MgHPO_4 \cdot 3H_2O + CO_2 + 2NaCl$
(3)   $Mg(NO_3)_2 + NaH_2PO_4 + NaOH + 2H_2O \rightarrow$
                          $MgHPO_4 \cdot 3H_2O + 2NaNO_3$ In order to produce pure and very white magnesium hydrogen phosphate-trihydrate, it is necessary that the solutions contain altogether less than 0.1% by weight, preferably less than 0.01% by weight, of impurities, especially iron, cobalt, nickel, vanadium, chromium, and manganese. Products prepared in this manner are more especially suitable for use in cosmetic or medicinal preparations, e.g. for use as a cleaning agent in tooth pastes.

The reaction is preferably carried out at a pH-value of 2.5 to 6.5 at a temperature of 20 to 80° C. Also, it has unexpectedly been found that a final product with a definite grain size or with a definite rate of grain size distribution can be obtained by carrying out the reaction at a definite temperature to which belongs a definite pH-value, or inversely at a definite pH-value to which belongs a definite temperature within the range of pH-values and temperatures specified above. Successively grinding $MgHPO_4 \cdot 3H_2O$ to obtain granular matter having a desired grain size is then unnecessary.

The solutions of the magnesium salt and the alkali metal oxide and/or carbonate, respectively, should be introduced in approximately equivalent proportions into the reactor so as to maintain a pH-value of 2.5 to 6.5.

When it is desired to produce grains having a size substantially smaller than $40\mu$, the reaction should conveniently be carried out at a temperature between 20 and 30° C.

Temperatures of 20 to 30° C. enable fine-grained products consisting to an extent of about 100% of grains smaller than $40\mu$ to be obtained within the whole pH-range of 2.5 to 6.5, but temperatures between 40 and 80° C. necessitate carrying out the reaction at a pH-value of 4.7 to 6.0 when the final product shall be formed substantially of grains having a size smaller than $40\mu$.

On the other hand, when the granular material shall have a grain size substantially above $40\mu$, it is necessary to use a temperature between 40 and 80° C. and simultaneously to use a pH-value between 2.5 and 4.5. A coarsely crystalline product of which a 85% proportion consists of grains with a size above $40\mu$ will then be obtained.

As already mentioned above, fine-grained $$MgHPO_4 \cdot 3H_2O \; (\sim 100\% < 40\mu)$$

will again precipitate when the pH-value is increased to 4.7–6.0 at the same temperature range, i.e. of 40 to 80° C. Increasing the pH-value further results in viscous or even solid reaction mixtures of which the analytic composition often corresponds no longer to that of the secondary magnesium phosphate-trihydrate.

From an economical point of view, it is most advantageous to precipitate $MgHPO_4 \cdot 3H_2O$ at a temperature range between 40 and 45° C. because little energy is then necessary to heat water which may have been introduced first, and because no excessive amount of cooling water for maintaining this temperature is then required. Coarse-grained products are obtained at that temperature with a pH-value of 3.5 to 4.0, and fine-grained products are obtained by selecting a pH-value of 4.7 to 5.5.

The starting products preferably include 25–25% by weight solutions of magnesium chloride or nitrate, 50 to 80% by weight solutions of orthophosphoric acid or its acid alkali metal salts, and 30–50% by weight solutions of alkali metal oxides or carbonates.

The following examples illustrate the invention without limiting it thereto:

EXAMPLE 1

A 120 liter coolable reactor made of stainless steel and provided with a high speed propeller stirrer (1500 r.p.m.) was charged with 40 liters water at 45° C. so that the stirrer and a pH-single rod glass electrode just dipped into the water. 39.3 kg. of a $MgCl_2$-solution (31.75% strength) and 21.4 kg. NaOH (49.1% strength) in substantially stoichiometric proportions were then caused to run simultaneously with phosphoric acid of 75% strength and with intimate agitation into the reactor so that a pH-value between 4.9 and 5.1 was maintained. The sum of impurities including Fe, Cr, Mn, Ni, Co and V in the solutions used was less than 0.01%. The reaction temperature was maintained at 40–45° C. by water-cooling. After all the $MgCl_2$-solution and sodium hydroxide solution had been consumed, the supply of phosphoric acid was stopped. The precipitated matter obtained could be filtered off at once by means of a vacuum drum filter and dried as usual at 90–120° C.

The secondary magnesium phosphate-trihydrate prepared at this pH-range was obtained in finely crystalline form; more than 99% of its grains had a size smaller than $40\mu$. Colorless starting solutions having a purity such as described resulted in a product having a degree of whiteness above 99% (compared with MgO for analyses).

EXAMPLE 2

The reaction was carried out in the manner and under the conditions set forth in Example 1 save that a pH-value between 3.7 and 3.9 was maintained during the reaction. The magnesium hydrogen phosphate-trihydrate produced at that range of pH-values consisted to an extent of 65 to 85% of grains with a size greater than $40\mu$. Despite the coarse grains, the product was found to have a degree of whiteness of more than 97.5%.

EXAMPLE 3

The reaction was carried out in the manner and under the conditions set forth in Example 1 save that a 25 to 75% proportion of the starting material was reacted at a pH-value of 3.7 to 3.9 and the balance proportion was reacted at a pH-value of 4.9 to 5.1. The products so obtained consisted to an extent of 30 to 60% of grains with a size $>40\mu$.

EXAMPLE 4

The reaction was carried out in a manner and under conditions analogous to those used in Example 1 save that the sodium hydroxide solution was replaced with an equivalent proportion of a sodium carbonate solution. The final product obtained corresponded to that obtained in Example 1 as regards yield and grain size.

EXAMPLE 5

The reaction was carried out in the manner and under the conditions set forth in Example 1 save that the phosphoric acid was replaced with an equivalent proportion of an alkali metal monophosphate solution. The final product obtained corresponded to that obtained in Example 1 as regards yield and grain size.

We claim:
1. A process for the manufacture of secondary magnesium phosphate-trihydrate which comprises simultaneously introducing into a reactor at a temperature between 20 and 80° C., (a) a solution of a magnesium salt, (b) a solution of at least one member selected from the group consisting of alkali metal oxides and alkali metal carbonates and (c) at least one member selected from the group consisting of phosphoric acid and a solution of a alkali metal monophosphate, reacting the said solutions by rapidly and intimately mixing them, whereby (a) and (b) are fed in proportions sufficient to maintain a pH-value between 2.5 and 6.5 and filtering and recovering the resulting reaction product.

2. A process as claimed in claim 1, wherein the reaction is carried out in the presence of additional water.

3. A process as claimed in claim 1, wherein all of the solutions contain less than 0.1% by weight of impurities including iron, cobalt, nickel, vanadium, chromium and manganese.

4. A process as claimed in claim 3, wherein the solutions contain less than 0.01% by weight of impurities.

5. A process as claimed in claim 1, wherein the reaction is carried out at a temperature between 20 and 30° C. resulting in the formation of grains with a size substantially below $40\mu$.

6. A process as claimed in claim 1, wherein the reaction is carried out at a temperature between 40 and 80° C. and at a pH-value between 4.7 and 6.0 resulting in the formation of grains with a size substantially below $40\mu$.

7. A process as claimed in claim 1, wherein the reaction is carried out at a temperature between 40 and 80° C. and at a pH-value between 2.5 and 4.5 resulting in the formation of grains with a size substantially above $40\mu$.

8. A process as claimed in claim 1, wherein the reaction is carried out at a temperature between 40 and 45° C. and at a pH-value within the range of 3.5 to 4.0 and 4.7 to 5.5, respectively, resulting in the formation of a coarse-grained product and a more fine-grained product, respectively.

9. A process as claimed in claim 1, wherein the magnesium salt solution is 25–35% by weight solution of magnesium chloride and magnesium nitrate, respectively.

10. A process as claimed in claim 1, wherein the phosphoric acid solution is a 50 to 80% by weight solution of orthophosphoric acid and its monoalkali salts, respectively.

11. A process as claimed in claim 1, wherein the solution of the alkali metal oxide and alkali metal carbonate, respectively, is a 30 to 50% by weight solution of the said alkali metal oxide and the said alkali metal carbonate, respectively.

References Cited

UNITED STATES PATENTS 3,294,486  12/1966  Cremer et al. _____ 23—109

OTHER REFERENCES

A. V. Grineva et al.: (Chemical Abstracts 53:8508i) Trudy Odessk. Gosudarst. Univ. in. I. I. Mechnikova, Ser. Khim. Nauk 146, No. 5, 37–45 (1956).

G. Denk et al.: (Chemical Abstracts 61:3747c) Z. Anorg. Allgem. Chem. 330 (1–2), 59–69 (1964).

S. Higashi et al.: (Chemical Abstracts 61:9197b) Brit. 962, 182 (cl. co1b), July 1964.

EARL C. THOMAS, *Primary Examiner.*

L. A. MARSH, *Assistant Examiner.*

UNITED STATES PATENT OFFICE
CERTIFICATE OF CORRECTION

Patent No. 3,433,586  Dated March 18, 1969

Inventor(s) Heinz Harnisch et al

It is certified that error appears in the above-identified patent and that said Letters Patent are hereby corrected as shown below:

Column 2, line 58 change "25-25%" to -- 25-35% --.

SIGNED AND SEALED

DEC 2 - 1969

(SEAL)
Attest:

Edward M. Fletcher, Jr.
Attesting Officer

WILLIAM E. SCHUYLER, JR.
Commissioner of Patents